United States Patent [19]
Cake

[11] 3,798,551
[45] Mar. 19, 1974

[54] MULTIPLEXED SIGNAL-SEQUENCE CONTROL SYSTEM

[75] Inventor: Arthur F. Cake, Smithtown, N.Y.

[73] Assignee: Wagner Electric Corporation, Newark, N.J.

[22] Filed: Sept. 15, 1972

[21] Appl. No.: 289,573

[52] U.S. Cl.............. 325/370, 307/271, 328/5, 340/258 B
[51] Int. Cl................................ H04b 1/06
[58] Field of Search.......... 307/271; 325/18, 29, 64, 325/113, 161, 164, 166, 169, 186, 187, 370, 395, 492; 328/5, 75, 260; 340/150, 183, 184, 258 R, 258 B; 317/146, 123 P

[56] References Cited
UNITED STATES PATENTS 3,200,305  8/1965  Atkins.................................. 328/5
2,937,268  5/1960  Downie et al...................... 325/370

Primary Examiner—Albert J. Mayer
Attorney, Agent, or Firm—Eyre, Mann & Lucas

[57] ABSTRACT

A plurality of capacitance-responsive sensor circuits are alternately energized by a free-running multivibrator and generate signals of a first class when a person is detected. The multivibrator also alternately enables a signal-sequence control circuit to sense one of a second class of input signals and to generate a control signal in response to either (1) one or more signals of only the first class or only the second class, or (2) unrelated signals of both the first and second classes, or (3) related signals of both the first and second classes occurring in an improper sequence.

17 Claims, 1 Drawing Figure

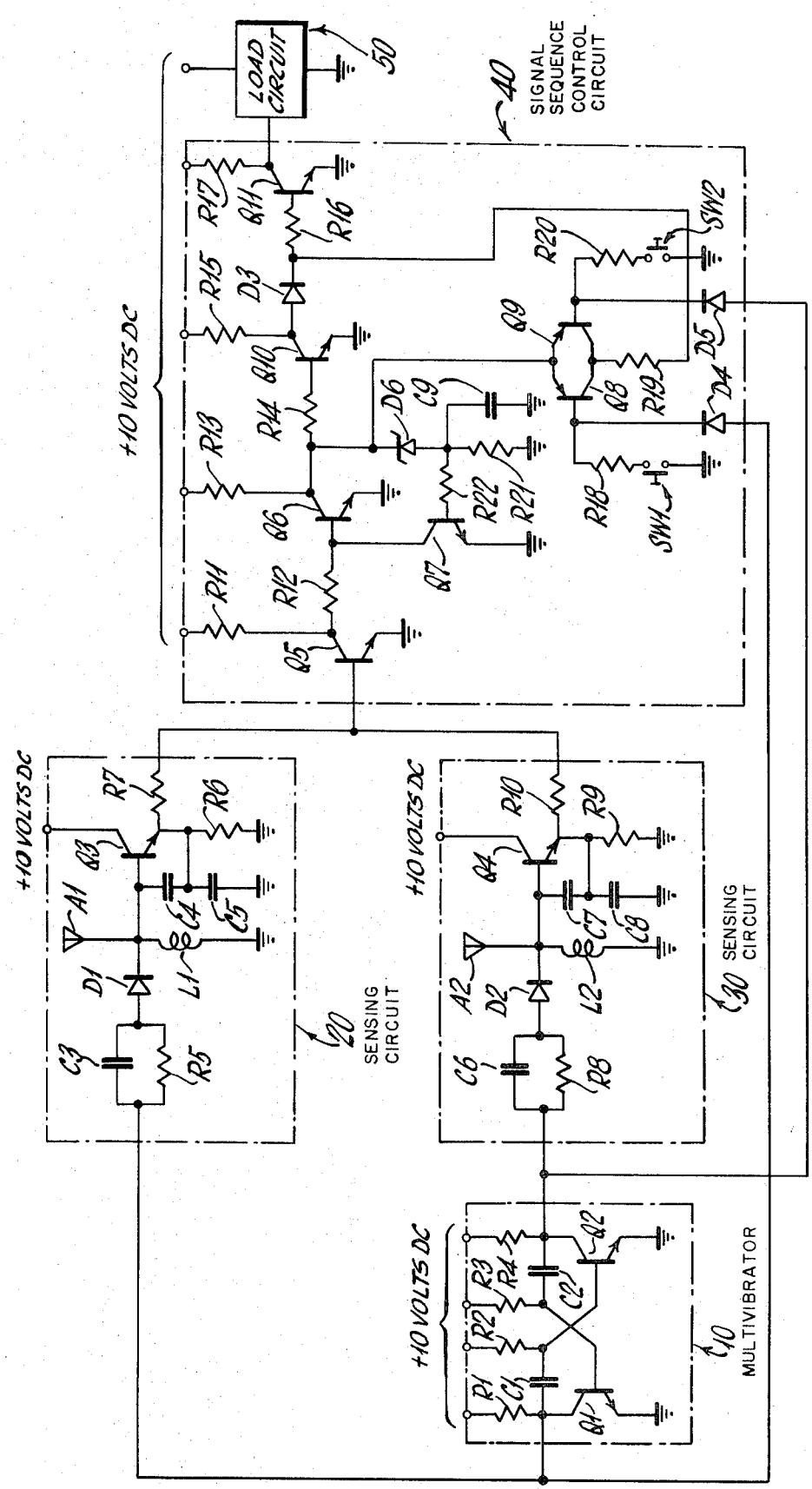

MULTIPLEXED SIGNAL-SEQUENCE CONTROL SYSTEM

CROSS REFERENCE TO RELATED APPLICATIONS

The present invention advantageously incorporates sensor circuits of the type disclosed and claimed in copending application Ser. No. 280,219 entitled CAPACITANCE RESPONSIVE CONTROL CIRCUIT filed on Aug. 14, 1972 in the name of Carl E. Atkins, and an improved form of the circuit disclosed and claimed in copending application Ser. No. 248,113 entitled SIGNAL-SEQUENCE CONTROL CIRCUIT filed on Apr. 27, 1972 in the name of Paul A. Carlson. The present invention may also advantageously employ the antenna system disclosed and claimed in copending application Ser. No. 245,799, now U.S. Pat. No. 3,740,567 entitled HIGH-DISCRIMINATION ANTENNA ARRAY FOR CAPACITANCE-RESPONSIVE CIRCUITS filed on Apr. 20, 1972 in the name of Carl E. Atkins. Also, the present invention may be advantageously employed to control a warning circuit of the type disclosed and claimed in copending application Ser. No. 255,155 entitled ELECTRONIC TIMING CIRCUITS filed on May 19, 1972 in the name of Paul A. Carlson.

BACKGROUND OF THE INVENTION

As a safety feature, it has been found to be desirable to include in automotive vehicles a system for detecting both proper and improper usage of seat belts and for providing visual and/or audible warning signals in response to improper use. Such systems may also disable the automobile either by preventing engine start-up or by preventing the car from being put into gear. Such systems may employ a variety of sensor circuits to provide signals indicative of (1) occupancy of a particular seat and (2) the condition of the buckle of the seat belt associated with that particular seat. The purpose of the present invention is to provide a system with the capability of generating and processing several signals of both classes wth a minimum number of circuit components and minimum power drain, and to provide an output signal in response to occupancy of any one of several seats without the associated seat belt buckle being fastened, or vice versa, or in response to any one of several seat belt buckles being fastened followed by occupancy of the associated seat. The output signal thus generated may be employed to control a warning circuit, or a vehicle disabling circuit, or both.

SUMMARY OF THE INVENTION

The present invention is embodied in and carried out by a system which is operative to generate and process a plurality of signals of a first class and a plurality of signals of a second class, the signals in each class being indicative of two separate conditions, and to provide a control signal in response to either (1) one or more signals of only one class or the other, or (2) unrelated signals of both the first and second classes, or (3) related signals of both the first and second classes occurring in an improper sequence. This relatively complex system functioning is achieved with a minimum of components by means of multiplexed power inputs to the plurality of circuits for generating signals of the first class, with synchronized enabling/disabling of the circuitry which detects the related signals of the second class.

BRIEF DESCRIPTION OF THE DRAWING

The prsent invention will be better understood when the written description thereof is read with reference to the accompanying drawing, which is a schematic circuit diagram of the preferred embodiment of the present invention.

DETAILED DESCRIPTION OF THE PREFERRED EMBODIMENT

Referring now to the drawing, the free-running (astable) multivibrator 10 is operative to energize alternately the input networks of sensor circuits 20 and 30. These two circuits include antennae A1 and A2, which when capacitively or ohmically coupled with a person or a resistive object, will cause circuits 20 and 30 to generate signals of a first class which are provided to the signal-sequence control circuit 40. These signals of a first class may, for example, be indicative of the condition of associated seats in an automotive vehicle, i.e., occupied or unoccupied. Signal-sequence control circuit 40 includes a pair of normally-closed switches SW1 and SW2 which may be mechanically incoporated into and operated by the seat belt buckles associated with the aforementioned seats. These switches SW1 and SW2, by being opened or closed by the latching or unlatching of a seat belt buckle, for example, provide signals of a second class to the system. In this automotive application of the present invention, the system will actuate the load circuit 50 under each of the following sets of conditions:

1. one or more of several seats occupied, with associated seat belt buckle(s) unfastened;
2. one of several seats occupied, with one or more associated seat belt buckle(s) fastened and then unfastened;
3. one or more of several seat belt buckles fastened, without occupancy of the associated seat(s); and
4. one or more seat belt buckles fastened, with the associated seat(s) subsequently occupied.

In operation, the initial circuit conditions are that (1) the outputs of sensing circuits 20 and 30 are low (near ground potential), and (2) switches SW1 and SW2 are closed. The multivibrator 10 alternately provides power pulses to the input networks of sensing circuits 20 and 30, which operate in the manner described in the cross-referenced copending application Ser. No. 280,219. Taking sensing circuit 20, for example, the multivibrator 10 supplies periodic pulses of positive polarity to the bias circuit formed by capacitance C3, resistance R5 and diode D1. Preferably, these periodic pulses have a frequency in the range from 10–20 kilohertz with a duty cycle of 50 percent, although other frequencies and duty cycles are acceptable. The value of capacitance C3 is selected to present nearly a short circuit to the positive-going pulses. During each pulse, capacitance C3 is charged with the polarity shown, but the net bias on diode D1 is forward. Thus, current flows through inductance L1 of the tuned circuit comprising L1, the variable impedance formed between antenna A1 and ground, and the capacitances C4 and C5 which also form part of the oscillator circuit which includes transistor Q3 and resistance R6. In this fashion, inductance L1 is saturated, thereby storing energy in its magnetic field. The impedance presented by L1 is small, and consequently loads the output of pulse generator 10 to an extent which prevents generation of an output signal of the first class by the enhancing oscillator comprising transistor Q3. After its stored energy reaches a maximum value, L1 presents a short circuit to the remainder of the positive pulse output of generator 10, thereby limiting the pulse amplitude to approximately ground potential during the remaining portion of each pulse.

The energy thus stored in L1 is not involved in the ringing of the tuned circuit. When the trailing edge of the positive-going pulse output of generator 10 is reached, the magnetic field of L1 collapses, thereby inducing a current pulse through L1 to ground that causes C3 to be charged to a higher level. Because diode D1 is a stored-charge diode, it stores more charge for a longer period of time and loses that charge faster than most semiconductor diodes. D1 has a substantial diffusion conductance at the time the trailing edge of the positive pulse occurs, and while this conductance exists, it prevents D1 from isolating the bias circuit comprising capacitance C3 and resistance R5 from tank circuit formed by L1, A1 and C4 and C5. Because C1 is charged by the positive pulse from generator 10 and the first inductive current pulse from L1, it acts as a small battery and causes current to flow from ground through L1, the diffusion conductance of L1, C3 itself, and through pulse generator 10 to ground. Thus, energy is again electromagnetically stored in L1. The reverse current through D1 causes the rapid elimination of the diffusion conductance of L1 which is thus enabled to isolate the bias circuit C3, R5 from the tuned circuit L1, A1, C4 and C5. Because diode D1 is back-biased by the remaining charge on C3 it presents a high impedance to the tuned circuit so as not to load it. The enhancing oscillator circuit comprising transistor Q3 is also designed so as not to load the tuned circuit. With energy no longer being applied to inductance L1, its magnetic field collapses, thereby producing ringing in the tuned circuit at the natural frequency of that circuit. During the interpulse null, i.e., the time between successive positive-going pulses when the pulse amplitude is at approximately ground potential, capacitance C3 partially discharges through resistance R5. The values of resistance R5 and capacitance C3 are chosen so that diode D1 remains back-biased during each interpulse null.

The oscillator circuit comprising transistor Q3, capacitances C4 and C5, and resistance R6 is operative to enhance the oscillations of the tuned circuit. In the absence of a positive output pulse from multivibrator 10, transistor Q3 is normally non-conductive since no base-emitter forward bias is provided. Capacitances C4 and C5 are chosen to meet the requirements of the tuned circuit and to provide sufficient regeneration to force transistor Q3 to oscillate when Q3 is forward-biased. Thus, when a positive pulse is provided through the bias circuit to the tuned circuit to induce ringing in the latter when the output of multivibrator 10 is at approximately ground potential, transistor Q3 is shocked into oscillation by the increase of bias provided by the positive portions of the oscillations in the tuned circuit. Transistor Q3 is maintained in oscillation even during damping of tuned circuit oscillations by the regeneration provided by capacitances C4 and C5. Resistance R6 is chosen to permit the damped oscillations to shock transistor Q3 into oscillations, thereby setting a threshold above which Q3 oscillates. Transistor Q3 is biased so that during oscillation, a positive DC component is developed at its emitter. As noted previously, the positive pulse fed from multivibrator 10 through the bias and tuned circuits is of insufficient amplitude to bias transistor Q3 into oscillation.

When no resistive load is coupled to antenna A1, the amplitude, frequency and duration of the damped oscillations of the tuned circuit are relatively fixed. However, when an impedance having a substantial resistive component is coupled to the tuned circuit by proximity to or contact with antenna A1, the merit factor Q of the tuned circuit is reduced, thereby sharply reducing the amplitude and/or duration of oscillations in the tuned circuit. An inanimate object, which in most cases does not possess a substantial resistive component, has little or no effect upon the Q factor of the tuned circuit, and therefore has little or no effect on the amplitude and/or duration of oscillations in the tuned circuit. When the merit factor Q of the tuned circuit is not degraded by coupling a resistive impedance thereto, the output of transistor Q3 taken at its emitter comprises an oscillatory component and a positive DC component during the ringing of the tuned circuit. When the tuned circuit is loaded, causing suppression of oscillations therein, the output of transistor Q3 loses its oscillatory component, and its DC component drops to approximately ground potential. It is the fluctuating DC component of the output of the sensing circuit 20 which forms the first signal of a first class, which is fed through resistance R7 as an input to the signal-sequence control circuit 40. All of the corresponding components in sensing circuit 30 operate in exactly the same manner as their counterparts in sensing circuit 20 to provide the second signal of a first class. These two signals from sensing circuits 20 and 30 are intermittently generated during alternate, complementary time periods. Since the multivibrator 10 provides an input pulse to sensing circuit 20 during a period of time in which no input pulse is provided to sensing circuit 30, and since as previously stated ringing of the tuned circuits in the respective sensing circuits takes place during the interpulse null, sensing circuit 30 will be generating its output signal, which will include a high or low DC component depending upon whether the tuned circuit is unloaded or loaded. Then, upon the termination of the input pulse from generator 10 to sensing circuit 20 and the concurrent initiation of an input pulse to sensing circuit 30, the tuning circuit of sensing circuit 30 will have ceased to oscillate, thereby allowing its output to drop to near zero potential, and sensing circuit 30 will generate its output signal, which likewise will include a high or low DC component depending upon whether the tuned circuit is unloaded or loaded. This alternate excitation of sensing circuits 20 and 30 eliminates interaction between the two oscillators and the two antennae A1 and A2. If there is no loading or insufficient loading of the tuned circuits in either sensing circuit, the positive DC components of their respective outputs will be combined to form a constant DC voltage input at the base of transistor Q5 in signal-sequence control circuit 40.

The signal-sequence control circuit 40 incorporates an improvement over the more basic circuit disclosed in cross-referenced application Ser. No. 248,113. Specifically, this improvement comprises the added capability of handling more than one pair of signals of a first and a second class, which capability is achieved by means of a transistor circuit operative to detect the condition of both switches SW1 and SW2. This transistor circuit is controlled by the complementary pulse trains generated by multivibrator 10 so that the signal-sequence control circuit simultaneously receives both related signals of the first and second classes from each of a plurality of seat/seat belt combinations during complementary time intervals. This is accomplished by disabling transistor Q9 by means of a positive pulse applied to the base thereof when the same positive pulse is applied to the input network of sensing circuit 20, and by disabling transistor Q8 by means of a positive pulse applied to the base thereof when the same positive pulse is applied to the input network of sensing circuit 30. Thus, the flow of information from one seat/seat belt combination to the signal-sequence control circuit will occur simultaneously and in alternation with the flow of information from the other seat/seat belt combination. In this manner, the signal-sequence control circuit 40 is prevented from generating a control signal and thereby actuating load circuit 50 in response to a signal of the first class from a first seat/seat belt combination and a signal of the second class from a second seat/seat belt combination. Since these unrelated signals are not received and acted upon during the same periods of time, they cannot operate to cause actuation of load circuit 50.

During each time period in which the signals from a particular seat/seat belt combination are received, transistor Q5 is normally conductive. Consequently, the low voltage appearing at the collector of Q5 and applied through resistance R12 to the base of transistor Q6 holds Q6 non-conductive. With both switches SW1 and SW2 normally closed as shown, either transistor Q8 or transistor Q9 will be conductive to close a current path through resistance R13, Q8 or Q9, resistances R19 and R16 and the base-emitter junction of transistor Q11. Thus, turn-on current is provided to Q11 to maintain the output voltage derived at its collector normally low. As long as the current path through either Q8 or Q9 is closed, the voltage applied to the cathode of zener diode D6 will be insufficient to cause the diode to break down and conduct. Consequently, transistor Q7 will be maintained non-conductive. However, the voltage normally developed at collector of Q6 and applied through resistance R14 to the base of transistor Q10 is sufficient to render Q10 conductive, thereby holding its collector low. Diode D3 serves to isolate this low voltage output of Q10 from the input of transistor Q11. Consequently, the low voltage normally developed at the collector of Q11 prevents actuation of the load circuit 50, which is preferably a lamp-flashing circuit of the type disclosed in copending application Ser. No. 255,155.

Now, taking as an example the sensing circuit 20 and related switch SW1, if the output of sensing circuit 20 goes from its normally high DC level to a low level, the signal-sequence control circuit 40 will respond during each interval it receives this signal of a first class by having transistor Q5 become non-conductive. Consequently, the voltage at the collector of Q5 will rise to approximately the value of the line voltage, and will drive transistor Q6 conductive. Thus, the turn-on current for transistor Q11 is shunted across the collector-emitter junction of Q6, and will no longer flow through conductive transistor Q8 and resistances R19 and R16 to render Q11 conductive. The low voltage now appearing at the collector of Q6 will cause Q10 to become non-conductive, thereby causing the collector voltage of Q10 to rise to nearly line voltage. However, the current developed as a result of the appearance of the high collector voltage of Q10 is shunted from the base of Q11 through diode D3, resistance R19, the collector-emitter junction of Q8 and the collector-emitter junction of Q6 to ground. Thus, Q11 becomes non-conductive and its collector voltage rises to approximately line voltage during alternate time intervals to provide a pulsating input to load circuit 50. However, once the switch SW1 is opened, thereby providing a signal of a second class, the shunt path just described is also opened since turn-on current can no longer flow across the emitter-base junction of Q8 through R18 and SW1 to ground. Consequently, the high voltage developed at the collector of Q10 is no longer shunted, but is applied through diode D3 and resistance R16 to the base of transistor Q11, causing Q11 to again become conductive. Thus, the collector of Q11 again becomes constantly low, thereby removing actuating voltage from load circuit 50.

If it should happen that a signal of a second class is generated before a signal of a first class, viz., if switch SW1 is opened before the output of sensing circuit 20 goes low, transistor Q8 will become non-conductive as a result of the cessation of flow of turn-on current across the emitter-base junction of Q8 through resistance R18 and switch SW1 to ground. The constant non-conductivity of Q8 also prevents the flow of turn-on current from the high collector of Q6 through R19 and R16 to the base of Q11, which is consequently rendered non-conductive and therefore develops a constant high voltage at its collector to actuate load circuit 50. Because Q6 is normally non-conductive, the voltage at the cathode of zener diode D6 will rise to approximately line voltage. Thus, diode D6 will break down and conduct, charging memory capacitance C9 and developing a positive voltage across resistance R21. This positive voltage is applied through resistance R22 to the base of transistor Q7, which is consequently rendered conductive. Thus, the base-emitter terminals of transistor Q6 are shunted through the collector-emitter terminals of Q7. Consequently, if a related signal of a first class is provided to the base of Q5 in the form of a low DC voltage, the resulting increase in the voltage at the collector of Q5 will be ineffective to change the conductivity state of Q6. Resistances R11 and R12 serve to limit the magnitude of current flowing through transistor Q7. During those periods of time in which the related signals from sensing circuit 30 and switch SW2 are being received by signal-sequence control circuit 40, transistor Q7 will be maintained conductive by the discharge of C9 through R21 and through R22 and the base-emitter junction of Q7. Thus, Q6 is constantly disabled from responding to any signal of a first class, and will remain non-conductive. If switch SW2 remains closed, Q9 will be rendered conductive during those periods of time in which the related signals from sensing circuit 30 and switch SW2 are received. Consequently, turn-on current will be provided to the base of Q11 during these periods as long as SW2 is closed, thereby resulting in a pulsating output voltage at the collector of Q11. If both switches SW1 and SW2 are opened, no turn-on current can be provided to Q11, and the output voltage at the collector of Q11 will be constantly high. Load circuit 50 may be designed to respond in the same manner to both pulsating and steady output voltages of Q11, or it may be designed to respond in different manners to these different control signals.

In the disclosed circuit which is the preferred embodiment of the present invention, the values and characteristics of the various components are as follows:

| Resistances | Capacitances |
|---|---|
| R1 — 470 ohms | C1 — 0.01 microfarads |
| R2 — 10K ohms | C2 — 0.01 microfarads |
| R3 — 10K ohms | C3 — 0.22 microfarads |
| R4 — 470 ohms | C4 — 0.022 microfarads |
| R5 — 5K ohms | C5 — 0.25 microfarads |
| R6 — 1K ohms | C6 — 0.22 microfarads |
| R7 — 470K ohms | C7 — 0.022 microfarads |
| R8 — 5K ohms | C8 — 0.25 microfarads |
| R9 — 1K ohms | C9 — 4.7 picofarads |
| R10 — 470K ohms | |
| R11 — 33K ohms | |
| R12 — 10K ohms | Inductances |
| R13 — 4.7K ohms | |
| R14 — 10K ohms | L1 — 39 μh |
| R15 — 100K ohms | L2 — 39 μh |
| R16 — 1K ohms | |
| R17 — 10K ohms | |
| R18 — 6.8K ohms | Transistors |
| R19 — 1K ohms | |
| R20 — 6.8K ohms | Q1 — 2N 5132 |
| R21 — 100K ohms | Q2 — 2N5132 |
| R22 — 100K ohms | Q3 — 2N5132 |
| | Q4 — 2N5132 |
| | Q5 — 2N5132 |
| | Q6 — 2N5132 |
| | Q7 — 2N5132 |
| | Q8 — 2N3638 |
| | Q9 — 2N3638 |
| | Q10 — 2N5132 |
| | Q11 — 2N5132 |
| | Diodes |
| | D1 — 1N 4148 |
| | D2 — 1N 4148 |
| | D3 — 1N 4148 |
| | D4 — 1N 4148 |
| | D5 — 1N 4148 |
| | D6 — 1N 5229 |

The advantages of the present invention, as well as certain changes and modifications of the disclosed embodiment thereof, will be readily apparent to those skilled in the art. It is the applicant's intention to cover all those changes and modifications which could be made to the embodiments of the invention herein chosen for the purposes of the disclosure without departing from the spirit and scope of the invention.

What is claimed is:

1. A multiplexed signal-sequence control system comprising:
   1 pulse generator means operative to generate first and second complementary pulse trains;
   2 first and second sensing circuit means at least partially energized by said first and second complementary pulse trains, respectively, and each operative to generate a signal of a first class in response to coupling of a predetermined impedance thereto; and
   3 signal-sequence control circuit means operative to receive said first and second complementary pulse trains, first and second signals of a first class, and first and second signals of a second class, and to generate a control signal in response to the presence of (a) one or both signals of only a first class or of only a second class, or (b) unrelated signals of both the first and second classes, or (c) related signals of both the first and second classes occurring in an improper sequence.

2. The system according to claim 1 wherein said pulse generator means comprises an astable multivibrator.

3. The system according to claim 1 wherein each of said first and second complementary pulse trains has a duty cycle of 50 percent.

4. The system according to claim 1 wherein each of said sensing circuit means comprises a shock-excited oscillator circuit including an antenna having a variable impedance to ground.

5. The system according to claim 4 wherein each of said shock-excited oscillator circuits comprises:
   1 tuned circuit means comprising an inductance and a capacitance connected in parallel and including said antenna, and operative to produce oscillations during each interpulse null;
   2 bias circuit means operative to pass the pulses from said pulse generator means to said tuned circuit with minimal attenuation, and to isolate said tuned circuits during each interpulse null; and
   3 enhancing circuit means operative to enhance the oscillations produced by said tuned circuit means.

6. The system according to claim 1 wherein said signal-sequence control circuit means comprises:
   1 first means operative to receive signals of a first class and signals of a second class, and to generate a first output in response to either (a) the absence of signals of both the first and second classes or (b) the presence of signals of both the first and second classes, and to generate a second output as said control signal in response to either (a) one or both signals of a first class only or (b) one or both signals of a second class;
   2 second means operative to prevent said first means for generating said first output whenever said first means has received one or both signals of a second class before receiving one or both signals of a first class; and
   3 third and fourth means operative to connect said pulse generator means to said first means and thereby to prevent said first means from generating said first output upon receiving unrelated signals of both the first and second classes.

7. The system according to claim 6 wherein said first means comprises:
   1 first transistor means operative to change conductivity state in response to one or both signals of a first class;
   2 second transistor means operative to change condictivity state in response to a change in conductivity state of said first transistor means;
   3 connecting means operative to close a current path between the output terminals of said first and second transistor means in the absence of a signal of a second class, and further operative to open said current path in response to both signals of a second class; and
   4 third transistor means connected to said first and second transistor means by said connecting means and operative to generate said first and second outputs.

8. The system according to claim 7 wherein said connecting means comprises first and second normally-conductive transistors each having its output terminals connected in series with a first resistance and a first diode between the output terminals of said first and second transistor means.

9. The system according to claim 8 wherein said first and second transistors have first and second input circuits, respectively, each comprising a resistance and a switch connected in series from the input terminal of the associated transistor to ground.

10. The system according to claim 9 wherein said third means is connected between the input terminal of said first transistor and a first output terminal of said pulse generator means, and said fourth means is connected between the input terminals of said second transistor and a second output terminal of said pulse generator means.

11. The system according to claim 8 wherein the input terminal of said third transistor means is connected through a second resistance to the junction of said first resistance and said first diode.

12. The system according to claim 8 wherein the output terminal of said first transistor means is connected through a third resistance to the input terminal of said second transistor means.

13. The system according to claim 6 wherein said second means comprises fourth transistor means operative, after one or both signals only of a second class have been received by said first circuit means, to shunt any subsequent signals of a first class from the input terminal of the second stage of said second transistor means.

14. The system according to claim 13 wherein said fourth transistor means includes bias circuit means connected between the output terminals of said first transistor means.

15. The system according to claim 14 wherein said bias circuit means comprises a voltage breakdown device connected in series with a fourth resistance, the junction thereof being connected to the input terminal of said fourth transistor means, and a memory capacitance connected in parallel with said fourth resistance.

16. The system according to claim 15 wherein said voltage breakdown device consists of a zener diode.

17. The system according to claim 6 wherein said third and fourth means each comprises a diode.

* * * * *